United States Patent Office 2,752,778
Patented July 3, 1956

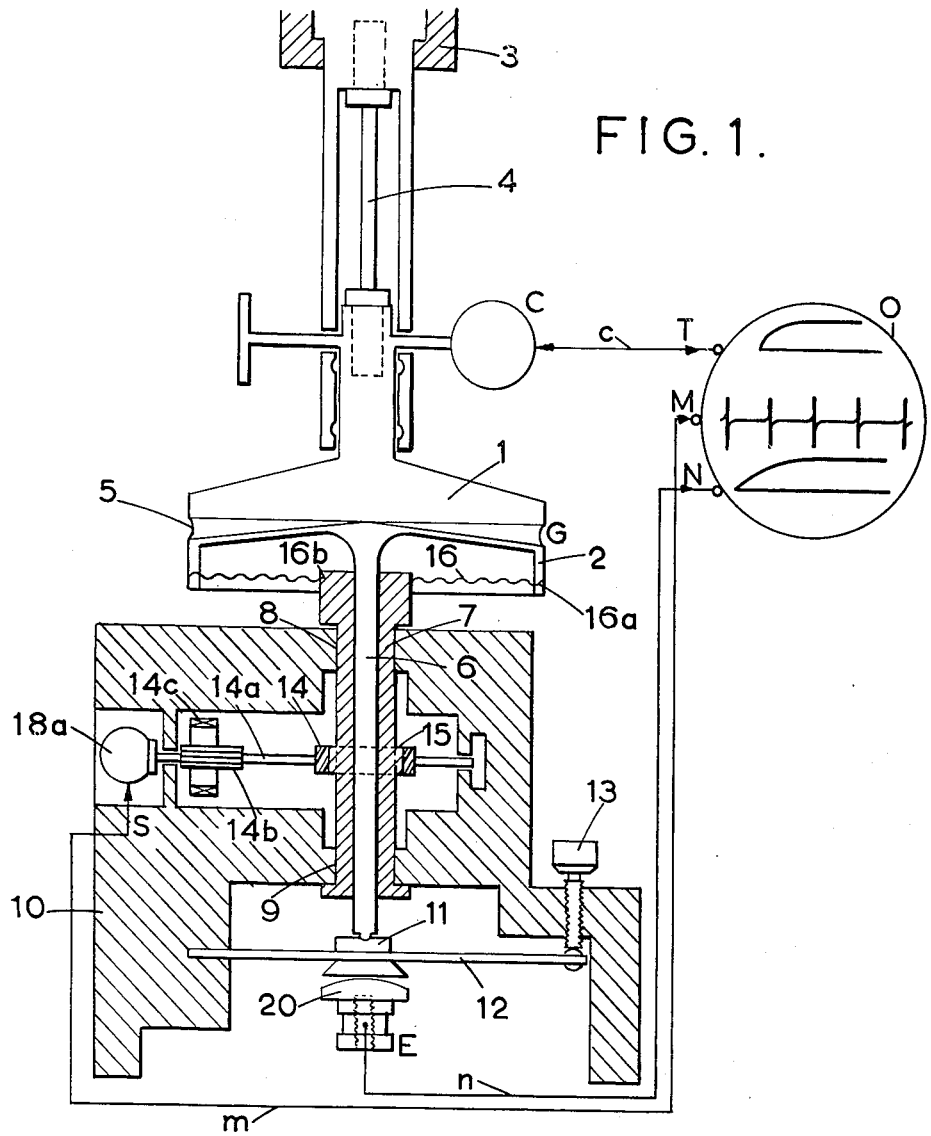

2,752,778

APPARATUS CAPABLE OF USE FOR THE STUDY OF RHEOLOGICAL PHENOMENA

John Edward Roberts, Horsham, and Karl Weissenberg, Wembley, England; said Roberts assignor to said Weissenberg Application July 20, 1954, Serial No. 444,614

Claims priority, application Great Britain July 24, 1953

6 Claims. (Cl. 73—60)

This invention relates to apparatus or equipment lending itself for the study of rheological phenomena, notably the determining of flow, pressure distribution and mechanical properties of flowing materials under mechanical actions.

Use may be made of a so-called "Rheogoniometer" for measuring the rheological properties of materials such that goniometric measurements of flow and pressure distribution can be taken covering the full solid angle in space at each instant of time and each point in the material. The "Rheogoniometer" consists in principle of a form of lathe bed conveniently mounted vertically, the lathe holding the material under examination in a gap between two grips, respectively located in the head and tailstock and easily exchangeable therein. To cover a desired range of consistencies of the materials from liquids to solids some grips may be constructed as vessels and other as clamps. Once the material is securely held it can be subjected to some mechanical action which is first generated by a suitable motor and then transmitted to the material under test. With a "Rheogoniometer" of the above-indicated character there may be suitably arranged a modulation in time which provides a variety of speeds that remain constant at various levels, or vary harmonically with various frequencies, phases and amplitudes, or vary unharmonically according to any prearranged schedule. Provision may also be made for sudden changes in velocity. The time modulated action may then be transmitted to the grips and propagated from there through the boundary surfaces into the bulk of the material. A modulation in space may be produced by an adjustment of the spacings between the grips and by a change of their forms from plane plates to cylinders, cones or other shapes. As the materials pass under the imposed mechanical actions through their different rheological states there may be measured at as many points as possible the miacroscopically observable forces and displacements in their respective developments in time, and in their distribution over the whole solid angle of directions in space. Data derived from measurements afforded by an apparatus of the above description can provide useful information concerning the study of colloidal chemistry and hydrodynamics, as also in connection with the quality control of production, and the design of flow equipment, in chemical and engineering industries in general.

Of various kinds of materials for which goniometric measurements of flow and pressure distributions may be called for, mention may be made of rayon, plastics, lubrication oils, greases, natural and synthetic rubbers, printing inks, paints, adhesives, gelatine, soaps, cosmetics, clays, waterglass, dairy products, dough, honey, etc. For every such material there may be deduced a comprehensive characterisation of the shear properties including viscosity, elasticity (rigidity), relaxation, thixotropy, elastic limits, breakdown, etc.

The testing methods, with the use of a "Rheogoniometer" may be applied to a variety of different mechanical actions including torsional shear under static conditions, steady motions at various rates of shear, and torsional vibrations of various frequencies and amplitudes.

Now, one of the purposes of the present invention is to provide improved means susceptible of being incorporated in the construction of a "Rheogoniometer" so as to facilitate in the reliable operation for purposes such as have been indicated above and to combine the advantages of ease of handling and a required high degree of accuracy over the wide range of conditions likely to be encountered in practical investigations.

With the foregoing purpose in view there is provided in accordance with the invention an apparatus for obtaining goniometric measurements of flow and pressure distribution of a material, comprising a pair of co-operating boundary members arranged to define a gap therebetween for holding the material under test, one of said members being torsionally held and the other taking the form of a driven rotary member having associated therewith a device for measuring axial thrust of the material on the driven member as the latter is being driven, wherein for eliminating or reducing interference from the drive when thrust measurements are being taken, the driven member is suspended between a flexible coupling link to the drive and a spring, the spring being sufficiently strong to measure the thrust of the material with a minimum of yield, and allowing free rotational movement of the driven member, and the link being arranged to yield easily to the whole range of any disturbing axial movements of the drive so as to leave practically unchanged the thrusts of the material on the driven member.

Conveniently the driven rotary member and the flexible link to the drive are so constructed that the member has the form of a boundary platen from which a spindle extends centrally downwards, passes freely through a hollow shaft, and bears with its lower end on the thrust-measuring spring, while the link comprises a device for transmitting the rotation of the drive to the hollow shaft, and another device for coupling the rotation of the shaft to the boundary platen, this latter device having the form of a resilient membrane which is fixed along an outer peripheral portion to the platen, and along an inner peripheral portion to the hollow shaft thus providing a coupling that is stiff against the rotational movements of the drive while weak and yieldable to any disturbing axial movement.

The spring aforesaid may be in the form of a cantilever having means thereon providing a foot-step bearing with which the free end of the spindle is caused to engage continually. Preferably also means are arranged for adjusting the strength of the spring.

In accordance with a further feature of the invention the drive for the driven boundary member includes a cooperating worm-and-worm wheel gear, so arranged as to impart to the said driven member a movement which makes the member either rotate unidirectionally, or to oscillate around its axis, or execute a movement in which an oscillation is superimposed on a steady rotation with respect to the axis. To this end, the worm may be arranged so that, where desired it can be reciprocated lengthwise whilst remaining in engagement with the worm wheel.

The driving mechanism above referred to may have the worm and wheel mounted such that a reciprocating lengthwise movement of the worm backward and forwards induces oscillatory motions of the wheel round the axis, while at the same time a unidirectional rotation of the worm induces a steady rotation of the wheel. The two motions of the worm can be actuated independently, as for example by two separate motors, so that a steady rotation of any speed may be modulated by superimposed oscillations of any prescribed frequency and amplitude.

One convenient form of improved "Rheogoniometer"

embodying the invention will now be described by way of non-limitive example with reference to the accompanying drawings wherein, Figure 1 is a diagrammatic part-sectional elevation of the apparatus showing the main constituents involved, while Figure 2 is a detail view, in plan, of a driving mechanism indicated in Fig. 1.

Referring firstly to Fig. 1 the apparatus comprises a pair of boundary members 1, 2 in the form of co-axially arranged horizontally lying superimposed circular platens. The upper platen 1, or so-called static boundary member, is suspended centrally thereof from a fixed top mounting 3 (preferably with some degree of axial adjustability) by means of a depending torsion member 4 such as a wire. The underside of the platen 1 is formed with a horizontally plane surface. The lower platen 2 which is arranged to be driven in unidirectional or oscillatory rotation about its axis, presents on its upper surface a nearly flat cone (with its apex nearest to the flat underside of the upper platen) the narrow gap G thereby formed between the upper platen 1 and lower platen 2 serving to hold the material under test, indicated at 5. Where desired, various other forms can be provided for the two boundary members 1, 2 such as a pair of flat plates or concentric cylinders, or cones with the same or slightly different cone angles. These boundary members 1, 2 may each be made of a light alloy material.

The mounting of the lower platen 2 may be established by providing the latter with a centrally depending spindle 6 passing through a hollow shaft 7 rotatable in bearings 8, 9 within a bottom fixed mounting 10 and having its lower extremity supported by a foot-step bearing 11 which in turn is resiliently carried by a transverse or cantilever spring member 12. The spring member 12 is anchored at one end to the mounting 10 whilst its sensitivity can be adjusted by means of a screw 13, thereby allowing for prescribed degrees of longitudinal movement or thrust of the spindle 6 that may be set up by the action of the material 5 within the gap G between the platens 1, 2 when the lower platen 2 is being rotated unidirectionally or in an oscillatory manner round the axis.

The drive for the lower platen 2 is effected through a device in the form of a driven worm and worm wheel gear 14, 15 acting upon the hollow shaft 7 which in turn is coupled to the platen 2 through another device consisting of an axially flexible membrane in the form of a circularly corrugated diaphragm 16. As will be seen from Figs. 1 and 2, the worm wheel 15 is carried on the shaft 7 and the worm 14, preferably biassed into engagement with the wheel 15 by means of a spring (not shown), is carried by a worm shaft 14a. The shaft 14a has a splined portion 14b extending through a pinion 14c adapted to be driven from a motor 17 through a gear wheel 17a. The end of the shaft 14a remote from the worm 14 engages, under a spring bias (not shown) with an eccentric 18a arranged to be driven by an independent motor 18. In this way, by using only the motor 17 the worm 14 and therewith (through the wheel 15, shaft 7 and diaphragm 16 in unison) the platen 2 can be rotated unidirectionally, at various speeds, while by using only the motor 18 there can be produced on the platen 2 oscillatory rotations at various frequencies, with different amplitudes determined by the setting of the eccentric 18a whose eccentricity can be varied in any suitable manner. By using both the motors 17 and 18 simultaneously, one can combine the two movements on the platen 2 and thus produce on it a steady rotation modulated by oscillations of any desired frequency and amplitude.

The corrugated diaphragm 16 takes the form of a centrally apertured thin disc of metal such as brass, with its outer peripheral portion 16a connected peripherally with the boundary platen 2, whilst its central inner portion 16b is peripherally secured to the shaft 7. In this way the diaphragm 16, between which and the spring 12 the platen 2 is suspended, can be made to be stiff against torque, whilst yielding easily to the whole range of any disturbing axial movements of the drive, or the hollow shaft 7. The spring 12 however, is rendered sufficiently strong to measure the thrust of the material with a minimum of yield, while allowing free rotational movement of the platen 2. In this way the coupling link between the drive and the driven member 2 ensures that the thrust of the material on the driven member remain practically unchanged under the whole range of any disturbing axial movements of the drive.

Measurement of the thrust exerted on the spring 12 through the spindle 6 of the platen 2 is effected by means of a suitable capacity gauge 20 connected in known manner through amplification means to the screen of a cathode ray oscillograph as indicated by the connection $n$ leading to the oscillograph O, a typical trace thereon being shown at N. By means of a micro-switch S associated with the shaft 14a of the worm wheel drive and a suitable connection $m$ with the oscillograph O a time base as indicated at M is provided. Measurement of the torque exerted on the upper boundary member 1 against the torsion wire 4 is effected through a suitably associated capacity gauge C having a connection $c$ to the oscillograph O whereon a typical trace is shown at T.

The torsionally held member 1 may be equipped with pressure measuring devices in the form of capacity gauges or capillary gauges of any of the known types. Furthermore, null methods are preferably used for all measurements of forces, whether on the static or driven member, each force acting on the measuring elastic restraint being counteracted thereby an equal and opposite force which prevents the restraint from moving out of its zero position during the measurement.

Measuring means may serve for a complete determination in space and time of the movements and forces in the material under test in the gap between the boundary platens aforesaid. The dimensions of the gap may conveniently be chosen so small that the movement of the material in the gap can be determined from that of the driven platen by a linear interpolation between this platen and the static one. In steady movements there may be measured with a tachometer the speed of rotation, each revolution being registered by means of a micro-switch applied to the driven platen and transmitting a signal to a cathode ray oscillograph, thereby providing a time base. In vibration the signals along the time base indicate the phase of the movement while the amplitude can be read off on the eccentric and the frequency on the tachometer. By using a known form of glass measuring body or head with capillary channels therein a direct check of the movement of the material may be made in all three dimensions of space by observing through a microscope the movements of small particles of dust or small air bubbles suspended in the material. Care should be taken that the movement is always a continuous one, free from turbulence, eddies or whirling motions.

In most cases the measurements of torque and thrust suffice to calculate in the conical gap the forces in the material at all points, and across planes of all orientation in space. The calculations have been verified experimentally for a large variety of materials and conditions, but remain open to doubt for any new material and set of conditions not previously tested. To remove any doubt one has to make additional experiments. These are of two types and are discussed hereunder for liquid materials. The experiments of the first type use, as the upper boundary member in the above-described apparatus, a measuring head bearing along a diameter, a series of capillary or capacity gauges which indicate the distribution of normal pressures across the shearing plane of the torque. The experiments of the second type use a surround attached to the lower boundary member and a standardised Newtonian liquid (such as water, etc.).

This liquid is kept in contact with the material under test along a cylindrical interface formed in the gap at various radial distances, so that for each distance the hydrostatic pressure in the liquid measures the pressure of the material normal to the interface. By combining all the experimental results, one is able to determine the complete distribution of forces in the material from first principles without any supplementary assumption.

We claim:

1. Apparatus for obtaining goniometric measurements of flow and pressure distribution of a material, comprising a pair of co-operating boundary members arranged to define a gap therebetween for holding the material under test, means for torsionally holding one of the said members, means for measuring torsional deflection of said member, drive means for rotating the other of said members, a device for measuring axial thrust of the material on the driven member as the latter is being driven, means for transmitting axial thrust from said driven member to said device, a spring acting on said driven member to oppose the axial thrust of the material thereon, said spring being sufficiently strong to measure the thrust of the material with a minimum of yield and allowing free rotational movement of the driven member, and a flexible coupling link connecting said driven member to said drive means, said coupling link being arranged to yield easily to the whole range of any disturbing axial movements of the drive so as to leave practically unchanged the thrusts of the material on the driven member.

2. Apparatus for obtaining goniometric measurements of flow and pressure distribution of a material comprising an upper boundary member, means for torsionally holding said upper boundary member, means for measuring torsional deflection of said upper boundary member, a lower boundary member comprising a platen and a spindle extending downwardly from said platen, said boundary members being arranged to define a gap therebetween for holding material under test, a device for measuring the thrust of the material on the lower boundary member, means for transmitting axial thrust from said lower boundary member to said thrust measuring device, a hollow shaft through which the spindle of said lower boundary member passes freely, drive means to rotate said hollow shaft, a resilient membrane fixed along an outer peripheral portion to said platen and along an inner peripheral portion to said hollow shaft thus providing a coupling that is stiff against the rotational movements of the drive but is weak and yieldable to any disturbing axial movement, and a spring bearing upwardly against the lower end of said spindle and opposing the axial thrust of the material on the platen, said spring being sufficiently strong to measure the thrust of the material with a minimum of yield and allowing free rotational movement of the driven member.

3. Apparatus as claimed in claim 2, in which the spring is in the form of a cantilever having means thereon providing a foot-step bearing with which the free end of the spindle is caused to engage continually.

4. Apparatus as claimed in claim 3, wherein means are arranged for adjusting the strength of the spring.

5. Apparatus as claimed in claim 3, having means for detecting and providing indications of movements of the spring resulting from said thrust movements of the driven boundary platen.

6. Apparatus as claimed in claim 1, wherein the drive for said driven boundary member comprises a wheel cooperating with said worm, first drive means to rotate said worm, and second drive means to produce reciprocation of said worm in the direction of its longitudinal axis, said first and second drive means being operable separately, so as to impart to said driven member an unidirectional rotation, when actuated upon solely by said first drive means, and an oscillatory movement around its central axis when actuated upon solely by said second drive means; said first and second drive means being operable concurrently so as to impart to said driven member a movement in which an oscillation is superimposed on a steady rotation with respect to said axis.

References Cited in the file of this patent

UNITED STATES PATENTS 2,037,529    Mooney _____ Apr. 14, 1936

OTHER REFERENCES

Journal of Scientific Instruments, vol. 27, No. 8, pp. 209–212, August 1950.